(12) United States Patent
Riches et al.

(10) Patent No.: US 7,424,621 B2
(45) Date of Patent: Sep. 9, 2008

(54) DATA PROTECTION

(75) Inventors: Simon Riches, Thornbury (GB);
Alastair Michael Slater, Malmesbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 571 days.

(21) Appl. No.: 09/955,223

(22) Filed: Sep. 19, 2001

(65) Prior Publication Data
US 2002/0035695 A1    Mar. 21, 2002

(30) Foreign Application Priority Data
Sep. 20, 2000    (GB) .................... 0023048.2

(51) Int. Cl.
*H04L 9/00* (2006.01)
*H04L 9/32* (2006.01)
*G06F 9/00* (2006.01)
*G06F 12/14* (2006.01)
*G06F 11/30* (2006.01)

(52) U.S. Cl. ............. 713/193; 713/169; 713/170; 713/194; 707/200; 707/201; 707/202; 707/203; 707/204; 726/18; 726/30; 714/5

(58) Field of Classification Search ......... 707/200–204; 711/111; 714/5; 713/187, 193; 726/26
See application file for complete search history.

(56) References Cited

U.S. PATENT DOCUMENTS

| 4,338,644 | A |   | 7/1982  | Staar                          |
|-----------|---|---|---------|--------------------------------|
| 4,788,641 | A | * | 11/1988 | Ishiguro et al. ......... 711/113 |
| 5,287,478 | A | * | 2/1994  | Johnston et al. ......... 711/111 |
| 5,715,313 | A |   | 2/1998  | Tsukuda et al.                 |
| 6,023,707 | A | * | 2/2000  | Hamada et al. ......... 707/202 |
| 6,374,266 | B1| * | 4/2002  | Shnelvar .................. 707/204 |
| 6,374,267 | B1| * | 4/2002  | Tam ....................... 707/204 |
| 6,701,450 | B1| * | 3/2004  | Gold et al. .................. 714/5 |

FOREIGN PATENT DOCUMENTS

| EP | 0884730   | 12/1998 |
| GB | 2217096   | 10/1989 |
| WO | WO 93/14501 | 7/1993  |

OTHER PUBLICATIONS

"The Art of Data Recording"; J Watkinson; published (1994); Focal Press, pp. 381-383.

* cited by examiner

*Primary Examiner*—Ayaz Sheikh
*Assistant Examiner*—Longbit Chai

(57) ABSTRACT

A data storage tape 4 has an associated memory device 3 in which is stored a number of signatures 12 each representative of and associated with a particular data set recorded on the storage medium. By comparing the signatures against either signatures created during reading of the data sets back from the tape or against reference information held on a secure database any tampering or alteration of the data on the storage medium can be detected.

38 Claims, 8 Drawing Sheets

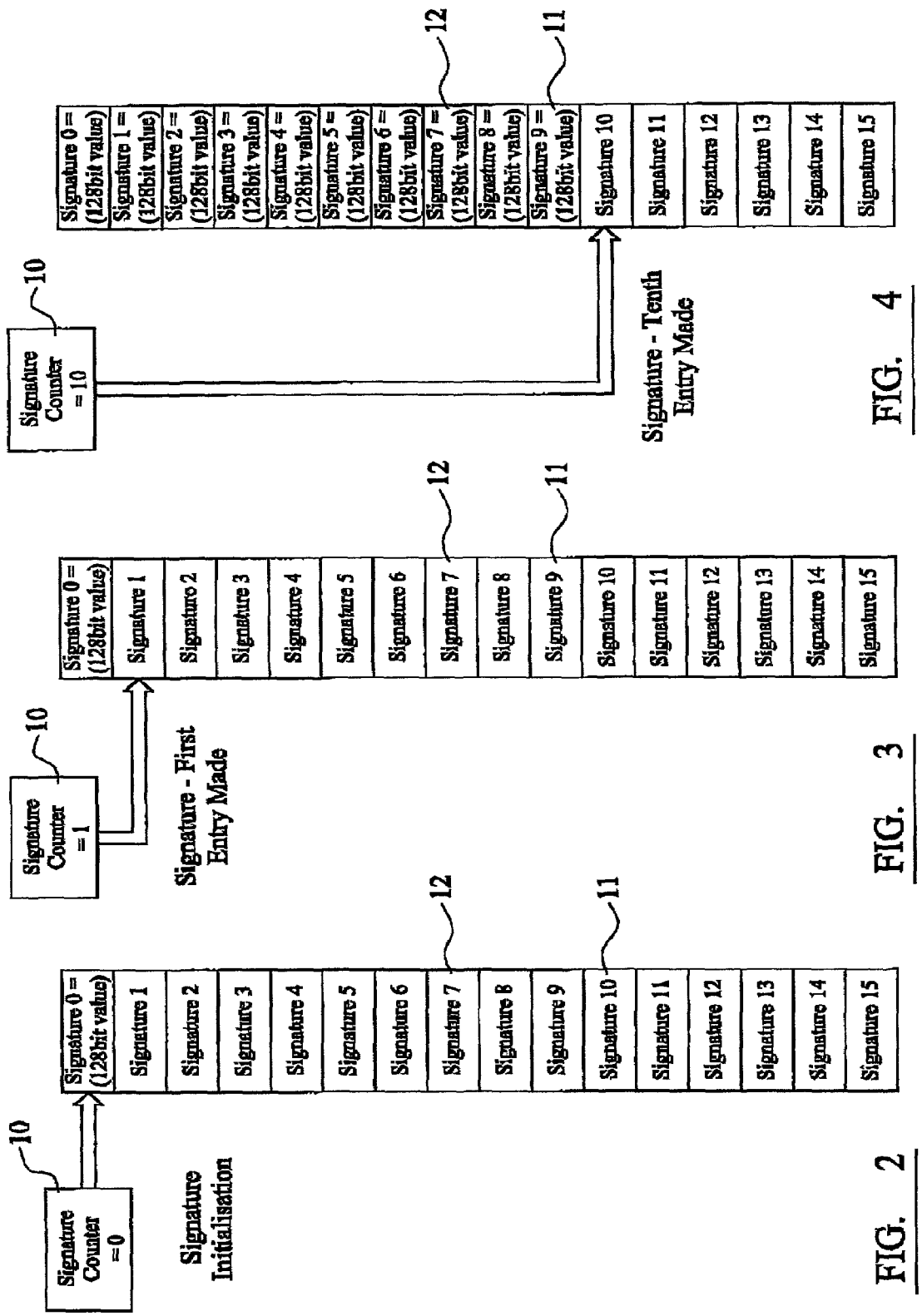

DATA PROTECTION

The present invention relates to the protection of data recorded on a data storage tape.

Such a data storage tape is typically a magnetic tape wound on one or a pair of reels within a casing, the whole being referred to as a "tape data storage cartridge".

Many data processing applications require back-up data to be held on storage medium such as magnetic tape. There is a need for such stored data to be protected against unauthorised amendments, additions or general tampering. The present invention finds particular though not exclusive applicability in specific environments, for example bank transaction records archives (Securities Exchange Commission (SEC) requirement), security records and the like.

It is an aim of embodiments of the present invention to provide data protection for data stored on a data storage tape.

According to a first aspect of the present invention there is provided a method of protecting data during writing of the data to a data storage tape, the method including the steps of: writing a data set to the tape and creating a code representative
of the content of the data set being written to the tape, and associating said code with said data set.

Preferably, the method includes the step of storing the code. More preferably, the code is stored by being written as an entry to a memory.

Preferably the code is associated with the data set by allocating an identification symbol to said code.

Preferably, said identification symbol is also written to the memory.

Preferably, the memory is incorporated within a memory device. Such a memory device may be physically associated with the tape, for example within the cartridge casing, and is preferably arranged such that it can be read and written to by inductive coupling.

Alternatively the memory may be a dedicated area of tape set aside for this purpose. The setting aside of a dedicated area of tape is known to those skilled in the art.

Preferably, the method includes repeating at least said data writing and code-with-data set associating steps to produce on the tape a number of data sets, each having a unique code associated with that particular data set.

Preferably, each access to the tape (irrespective of the nature of the data to be written) is treated as a new data set.

Preferably, the identification symbol is simply the number corresponding to the position of a particular code entry within a sequence of such code entries (i.e. the $3^{rd}$ entry in a sequence of 16 entries.

Thus, each code entry corresponds to a distinct storage session on the tape.

Preferably, the method includes the further steps of:
reading back a data set from the tape and creating a further code representative of the content of the data set read back from the tape,
comparing the two codes and confirming the data set as valid only if the two codes agree.

The comparing and/or confirming steps may be carried out by the controlling software application, or alternatively may be carried out by means of, for example, an external reader which is able to access and/or display information recorded in the memory.

Preferably, at least the codes created during writing of the data sets to the tape are written as entries to a table in the memory device, in which each entry is identified by its position within the table.

Preferably, said code is a signature.

Alternatively said code is a checksum or CRC (cyclic redundancy check).

The code creating steps may be carried out by apparatus used to write to and/or read from the tape (for example a tape drive), or alternatively they may be carried out by a controlling software application using existing code creation software.

Preferably, the tape is magnetic tape and more preferably is an implementation of Linear Tape-Open (LTO) technology, either single reel or dual reel.

Preferably, the memory device includes a memory area (for example an electrically erasable programmable read only memory or EEPROM) and a transponder comprising a transmitter, a receiver, an aerial, a processor and a crystal oscillator. The transponder of the memory device is powered by and exchanges information with a reader/writer device for reading data from and writing data to the memory device, via a contactless (inductively coupled) interface. The reader/writer device is typically incorporated within the tape drive such that when the tape cartridge is inserted into the tape drive the memory device is powered inductively and data signals can be sent and received via said interface. Such a memory device is hereinafter referred to as a "cartridge memory".

Such a cartridge memory is currently provided with LTO tape cartridges, which can store and retrieve a tape cartridge's historical usage and other information which can then be interrogated without the need for any physical contact between the tape and tape reader. Such a cartridge memory is an embedded electronics and interface module.

Conveniently, said identification symbol is numeric.

Preferably, said identification symbol is an integer.

Preferably, each time a data set is written to the tape and a corresponding associated code is written to the memory, the next code representative of the next data set is entered as the next entry to the memory, for example by incrementing a code counter by 1 in the case where the identification symbols are integers 0, 1, 2, 3, 4, 5 . . . etc.

Preferably, the method includes the step of keeping count of the total number of codes written to the memory device, that is to say the total number of entries made to the table in the memory.

Preferably, the method includes the step of checking whether or not a predetermined number of entries has been exceeded, and if it has, reporting the tape as read only.

Preferably, said predetermined number of entries is 16.

Preferably, said identification symbol is an integer of between 0 and 15.

Conveniently, the method further includes the steps of:
comparing the associated code with information held on a secure database, and
confirming the tape and/or the data contained thereon as valid only if the code and its association with a particular data set agree with the information held on the secure database.

Such a secure database may, for example, be a database containing a table of values which is an exact mirror of the contents of the memory device for each particular section of tape. The secure database preferably can only have additional entries written to it until the maximum number of entries for that section of tape has been reached. All other accesses to the secure database are read only, such that the entries thereto cannot be overwritten.

Again, the comparing and/or confirming steps may be carried out by the controlling software application, or alternatively may be carried out by means of, for example an external reader.

Such an external reader preferably comprises an apparatus having a port arranged to locate a tape cartridge therein, a display device such as a liquid crystal display, a user input interface in the form of a keypad, a battery or other power supply, a receiver device in or near the cartridge port for communicating with a cartridge memory, and an external port for connecting to an external computer or processor.

Preferably, said information held on the secure database includes a secure copy of the code. Such a secure copy may, for example, be a read-only exact mirror of the contents of the memory.

In the preferred embodiment where the steps are repeated to produce a number of data sets, the storage medium would be confirmed as valid only if all of the codes and their associations agree with the information on the secure database.

By carrying out the comparing and confirming steps by means of external hardware, such as an external reader, the tape cartridge does not have to be inserted into a tape drive in order to confirm the validity of the tape and/or the data contained thereon.

Therefore, the method of the present invention has as a particular advantage the ability to confirm the validity of for example a tape and/or the data on the tape, without the need for a tape drive.

According to a second aspect of the present invention there is provided a method of protecting data during writing of the data to and reading of the data from a data storage tape, the method including the steps of:

writing a data set to the tape and creating a first code representative of the content of the data set being written to the tape, associating said first code with said data set, reading back a data set from the tape and creating a second code representative of the content of the data read back from the tape, and comparing the first and second codes and confirming the data set as valid only if the two codes agree.

Preferably, the method includes the step of storing the code. More preferably, the code is stored by being written as an entry to a memory device.

According to a third aspect of the present invention there is provided a method of protecting data during writing of the data to a data storage tape, the method including the steps of:

writing a data set to the tape and creating a code representative of the content of the data set being written to the tape, associating the code with the data set, comparing the associated code with information held on a secure database, and confirming the tape and/or the data contained thereon as valid only if the code and its association with a particular data set agree with the information held on the secure database.

Preferably, the method includes the step of storing the code. More preferably, the code is stored by being written as an entry to the memory device.

According to a fourth aspect of the present invention there is provided a data storage tape having recorded thereon at least one data set, wherein said data set has associated therewith a code representative of the content of said data set.

Preferably the code is stored as an entry to a memory.

According to a fifth aspect of the present invention there is provided a data storage tape arranged such that a data set recorded therein may be associated with a code representative of the content of said data set.

Preferably, the code is associated with a particular data set by means of an identification symbol.

Preferably the identification symbol is also stored in the memory.

Preferably, the memory is incorporated within a memory device. Such a memory device may be physically associated with the tape, for example within the cartridge casing, and is preferably arranged such that it can be read and written to by inductive coupling.

Alternatively the memory may be a dedicated area of tape set aside for this purpose.

Preferably, the memory device has stored therein a number of codes, each representative of a particular one of a number of data sets on the tape and identifiable as associated with that particular data set.

Preferably, the codes are written as entries to a table in the memory device, in which each entry is identifiable by means of its position within the table.

Preferably, the code is a signature. Alternatively, the code may be a checksum or CRC (cyclic redundancy check).

Preferably, the memory device is a cartridge memory.

Preferably, the identification symbol is numeric, more preferably it is an integer, and even more preferably an integer between 0 and 15.

Preferably, the memory device includes a counter which indicates the number of codes entered.

For a better understanding of the invention, and to show how embodiments of the same may be carried into effect, reference will now be made, by way of example, to the accompanying diagrammatic drawings in which:

FIG. 2 illustrates initialisation of the signature counter;

FIG. 3 illustrates the first signature entry being made;

FIG. 4 illustrates the tenth signature entry being made;

Figure 1:
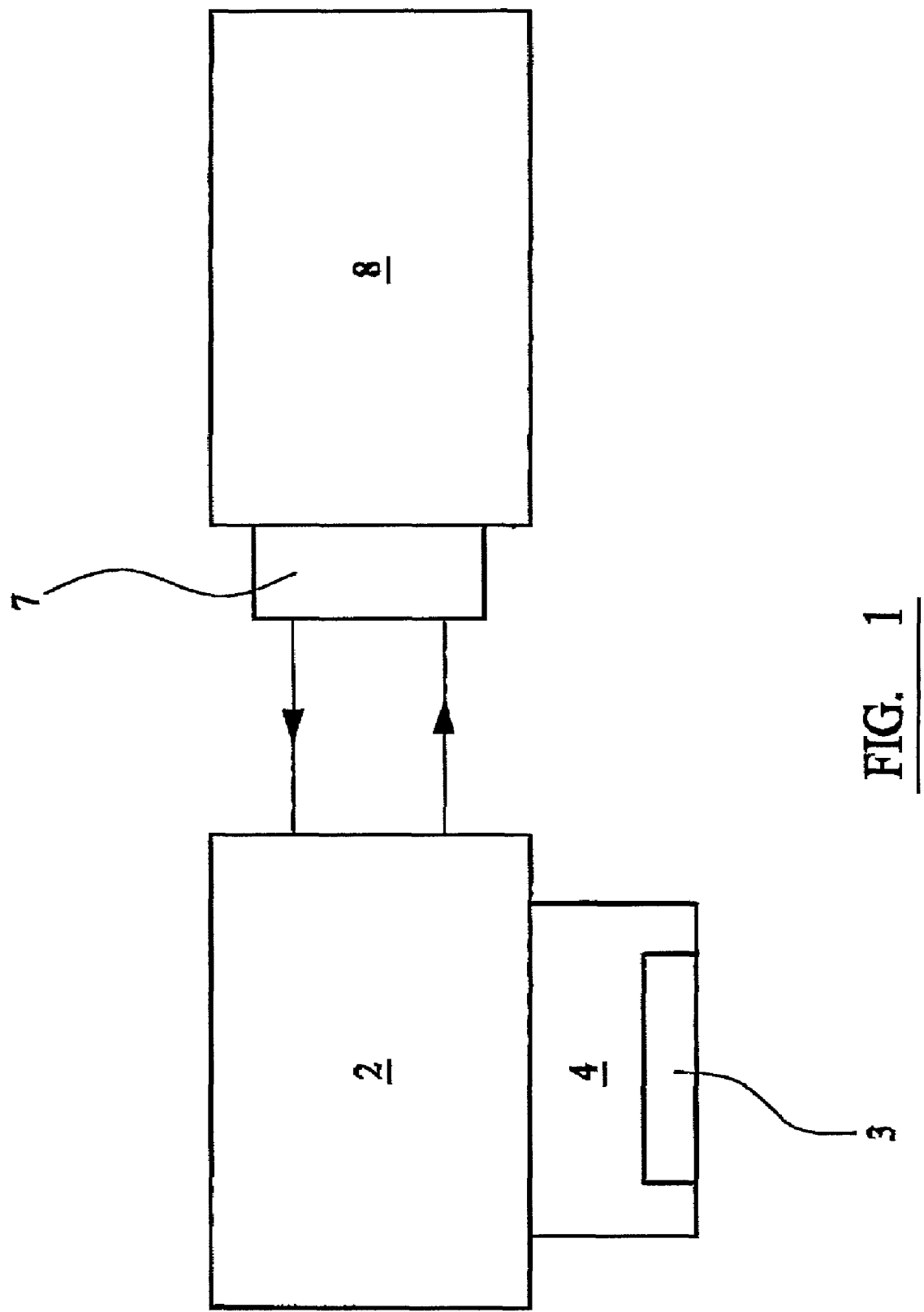
FIG. 1 is a schematic layout of the tape drive and controlling software application.

Referring to the drawings, and to FIG. 1 in particular, a controlling software application on a host system 8 controls the operation of a tape drive 2 which reads data from and writes data to a tape data storage cartridge 4 comprising a tape 4a housed within a casing 4b. The host system typically comprises a computer 8 (main frame or PC) including at least one central processing unit (CPU) and at least one memory.

The back up software application controls the tape drive 2 through either operating system device drivers, or via the back up application's own software device drivers. Both methods of controlling the tape drive are known to those skilled in the art.

Figure 10:
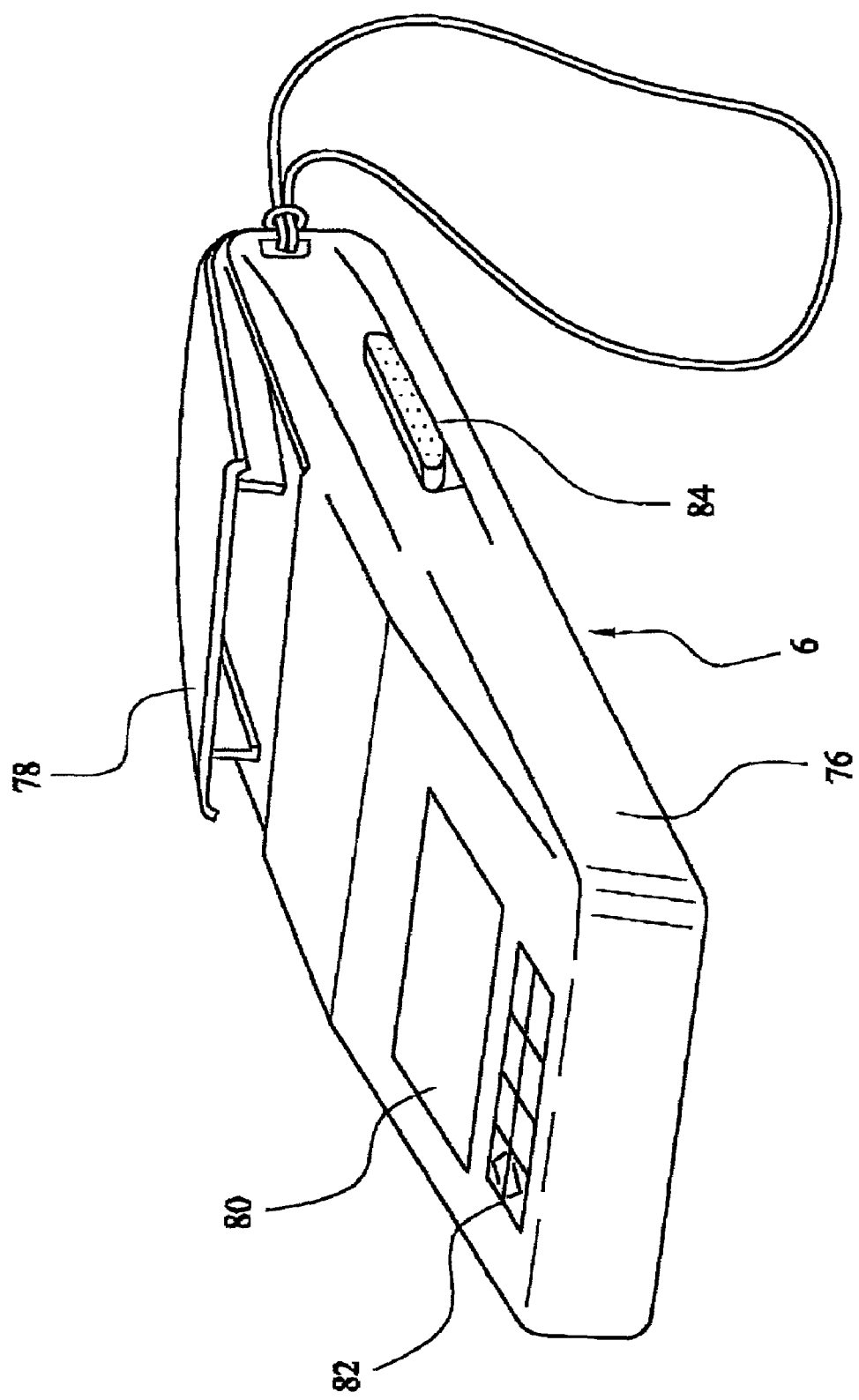
FIG. 10 illustrates an external reader.
Figure 11:
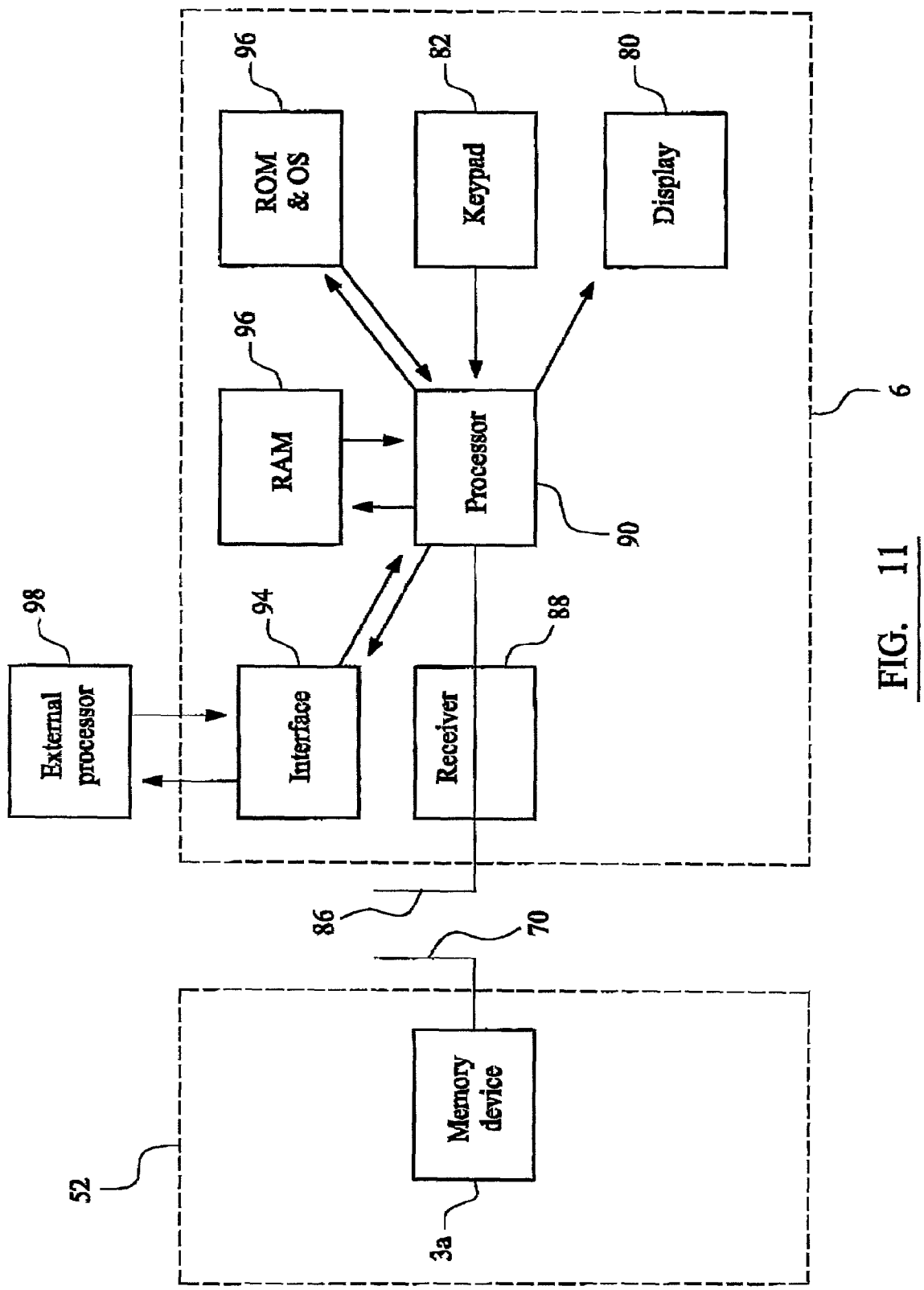
FIG. 11 illustrates schematically the interaction of the reader with a memory device of the data cartridge.

The tape cartridge 4 may be read by means of an external reader 6, shown in FIGS. 10 and 11.

In the preferred embodiment the drive 2 is connected to the host system 8 by means of a Small Computer Systems Interface (SCSI) bus 7 or a USB (Universal Serial Bus). A SCSI bus serves to connect peripheral devices (such as tape drives) to a computer via a SCSI controller. The method of communication over either of these standard busses is known to those skilled in the art.

The memory device 3 of the tape cartridge 4 has nonvolatile storage capabilities such as EEPROM (electronically erasable programmable read only memory), with memory address space allocated for codes in the form of either signatures, or checksums, or CRCs (cyclic redundancy checks)

corresponding to each set of data written to the tape. The memory device 3 has associated therewith a reader/writer device 50 for reading data from and writing data to the memory device 3.

A transmitter/receiver module 50 is incorporated into a tape drive mechanism such that when a tape cartridge is inserted into the tape drive mechanism, a transponder memory device 52 incorporated within the data cartridge can be inductively powdered, and data signals can be received and sent between the transmitter receiver 400 on the tape drive and the transponder in the tape cartridge.

The tape drive transmitter/receiver 50 comprises: a serial interface 54 to the tape drive; a processor 56; a transmitter 58; a receiver 60; a first aerial 62; and a crystal oscillator 64. The memory device 3 comprises a memory area 3a which may be an electrically erasable programmable read only memory (EEPROM) and a transponder 52 consisting of a transmitter 66; a receiver 68; an aerial 70; a processor 72 and a crystal oscillator 74; the reader/writer device 50 and the transponder 52 exchange information using a contactless interface via aerials 62 and 70.

This contactless interface uses inductive coupling employing a magnetic field to transmit data to/from the transponder 52, and supply power to the transponder 52 and memory area 3a. A protocol used to transmit information via inductive coupling is the known MIFARE® system developed by Philips/Mikron as is currently employed in "smart" credit card technology used in personal banking applications. The main advantages and features of this system as used by the present invention include high reliability, an operating frequency of 13.56 MHz, and the ability to handle several data storage cartridges within an operating field of a single data storage device.

The signatures to be written to a signature area 11 of the memory 3 in accordance with embodiments of the present invention are proposed to take up 128 bytes per signature, and it is proposed that the maximum number of signatures is 16. The memory also preferably includes space 10 (the count field) in which to indicate the number of signatures written to the memory. The memory device such as a cartridge memory contains a flag, which is set in its manufacturing data, to indicate that it supports this signature capability. Such manufacturing data is typically information stored in the cartridge memory at the time of manufacture with details such as media vendor, brand name, capacity etc. The flag can be set either at the time of manufacture or upon the first insertion into the tape drive.

The external cartridge memory reader or tape drive may also include a message display device (such as an LCD display or equivalent) for reporting whether or not the memory is capable of receiving signatures and/or the current number of signatures in the memory.

A new blank tape cartridge has no signatures in the signature area 11 of its memory 3 and the signature count field 10 is initialised so that the signature count is zero. Each time a signature is added to the signature area the signature count is incremented by 1, such that at any time the signature count indicates the total number of signature entries (see FIGS. 2, 3 and 4) held within the signature area 11 of the memory 3.

The only way a signature entry can be deleted is by complete re-initialisation of the data cartridge (which completely destroys the data on the cartridge), for example by means of a full erase command sent to the tape drive containing the tape cartridge by the controlling software back up application. This command both erases the data on the tape and the contents of the cartridge memory, other than those created at the tape's time of manufacture.

Each new access to the tape, such as for example to append data to an existing data set, is treated as a new set of data and the signature count is therefore incremented by 1 and written to the memory, in order to be able to trace or prevent amendments.

The implementation of the features of each of the two preceding paragraphs is known to those skilled in the art.

Figure 5:
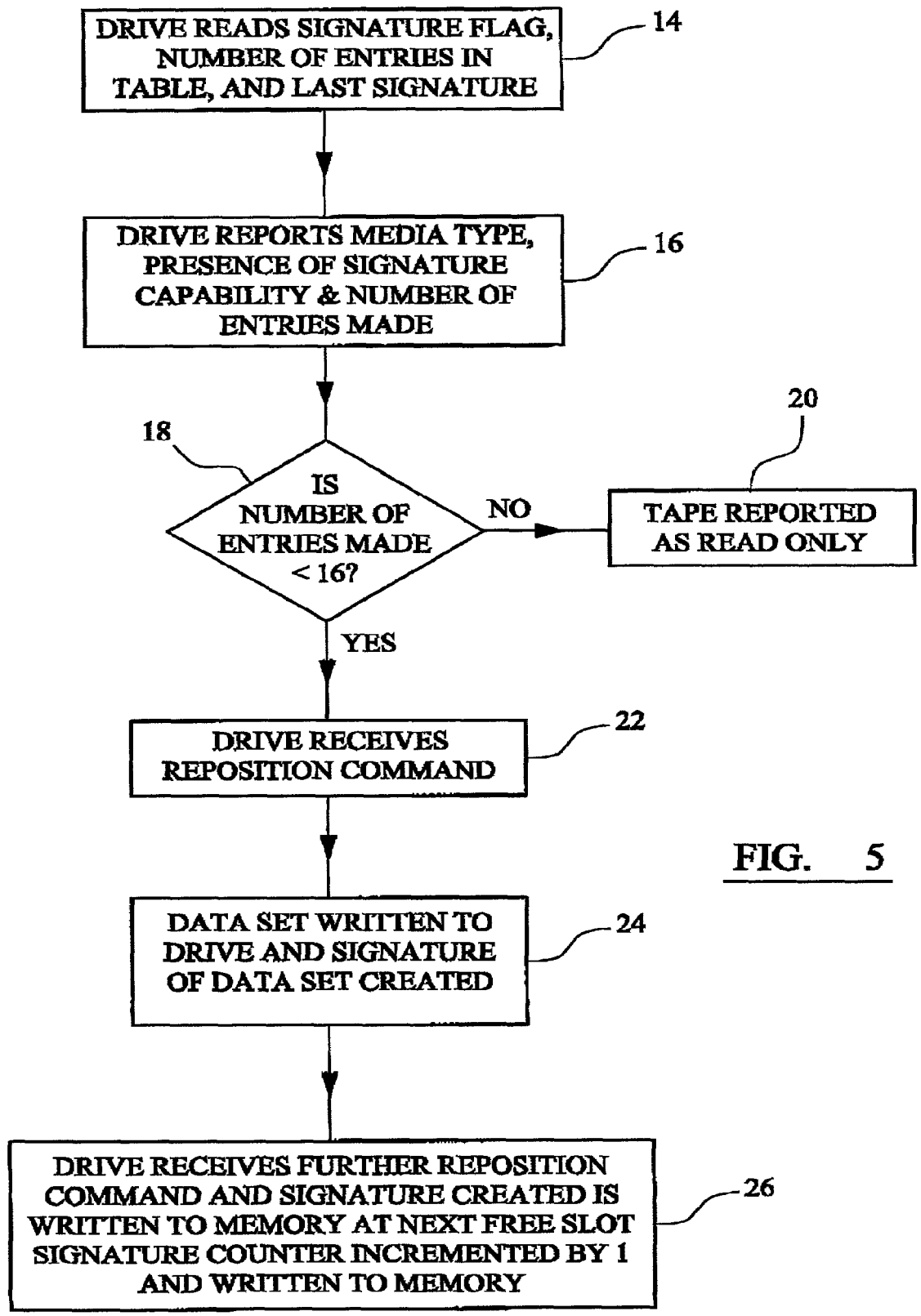
FIG. 5 illustrates the procedural steps carried out during a back-up operation.

As illustrated in FIG. 5 in flow chart form, to back up data by writing sets of said data to the tape, the tape cartridge 4 is loaded into the drive 2 and the drive then reads the signature flag from the cartridge memory 3, the number of entries in the signature table 11 and the last signature entry (step 14).

The tape drive uses this information to recognise the type of medium installed (i.e. with or without signature capability) and to work out the number of entries still available for writing signatures, and reports these two items of information to the controlling software application on the host system.

If the number of entries already in the table is equal to 16, the tape is reported as being read only (step 20), to prevent any further entries being made to the tape. This is achieved by setting the appropriate flag in the tape's cartridge memory to report that the tape is read only, and also by setting the appropriate bit in the relevant mode page to indicate this status. In order to be able to report the tape as read only, the controlling back up application inquires of the drive as to the status of the tape. The controlling back up application reads that the tape within the drive is only capable of read-only accesses. Such inquiring and reporting steps are known to those skilled in the art.

If the number of entries is less than 16 the cartridge reports, by carrying out the same steps as just previously described, that the memory 3 is capable of receiving signatures and it will also report the total number of entries in the signature table 11. The capability of the memory to receive signatures is optionally displayed via its message display device.

At commencement of a back up session the controlling software application issues a reposition command to the tape drive (step 22) to indicate that a back up session is about to start (alternatively a write from BOM (Beginning Of Media) signifies that new signature calculation should begin).

The data set is then written to the drive and during this process a signature of the data set is created, either within the tape drive itself or by the controlling software application depending on the tape drive's capabilities (step 24). Such a signature may be, for example, a running cyclic redundancy check (CRC) usually based on 32 bits or greater, which is kept of the data and is written to the cartridge memory, by either the tape drive or the controlling application, upon completion of the data being written to the tape. This technique is already known to those skilled in the art of CRC generation.

Following writing of the data set to the tape, the drive is issued with a further reposition (or unload) command from the controlling software application and at this stage the signature created for the data set just written to the tape is written to the cartridge memory at the next free signature slot either automatically by the drive itself or by the controlling software application to a write flag value in the new mode page. The controlling back up application first checks to see if the tape drive is capable of generating the CRC. If it cannot generate the CRC then the back up application generates the CRC.

It is preferred that the drive generates the CRC (or signature) as such an arrangement would be less prone to software modifications.

At the same time the signature count is written to the cartridge memory 3 by the drive and automatically incremented by 1 (the mode page entries for this information are also updated to contain the new information) (Step 26).

Thus, by incrementing the signature counter each time data is written to the tape (whether that data is original or modified data), any re-write of a data set can be detected. If the controlling back up application generates the signature then the software limits the accesses to the cartridge memory to allow retrieval and new signature creation only, which prevents overwriting of a signature.

Figure 6:
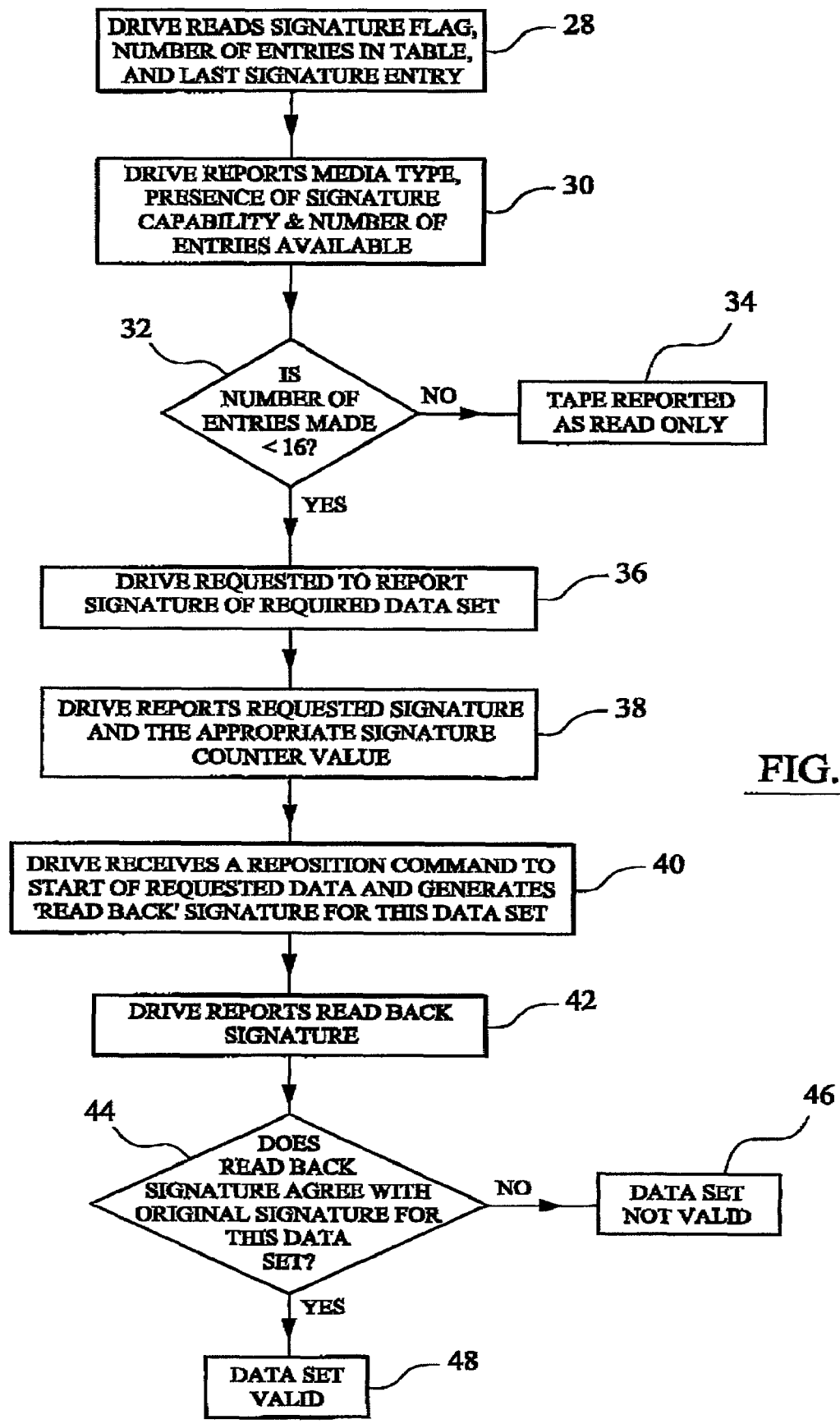
FIG. 6 illustrates the procedural steps carried out during a restore or validation operation.
Figure 7:
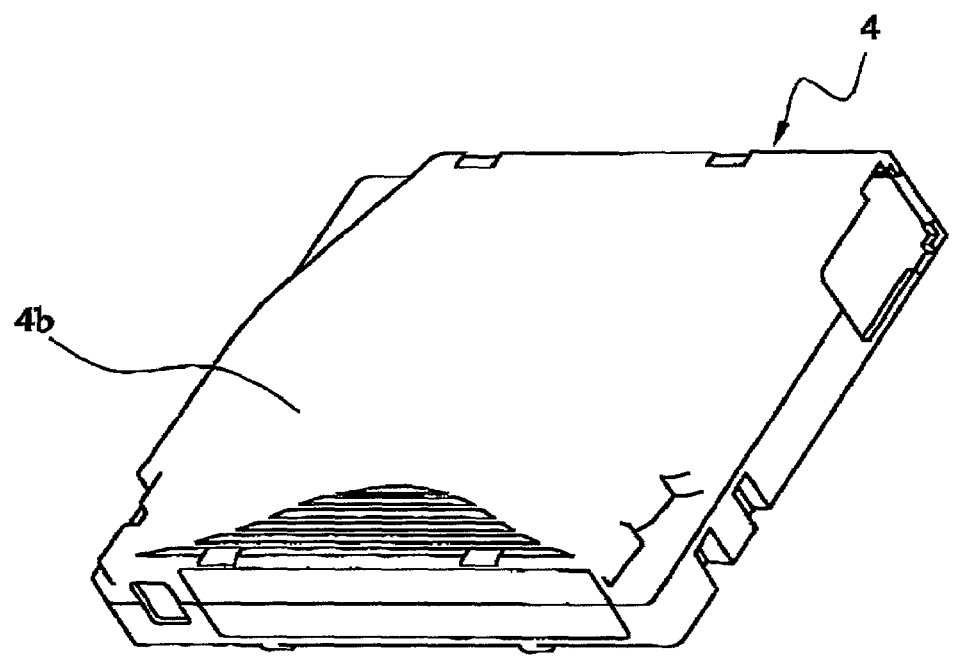
FIG. 7 illustrates a tape data storage cartridge.
Figure 8:
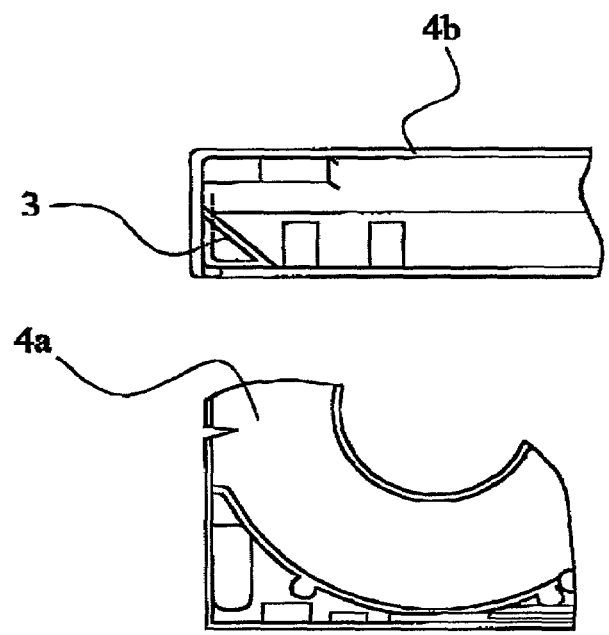
FIG. 8 illustrates two views of the cartridge, showing the position of a memory device.
Figure 9:
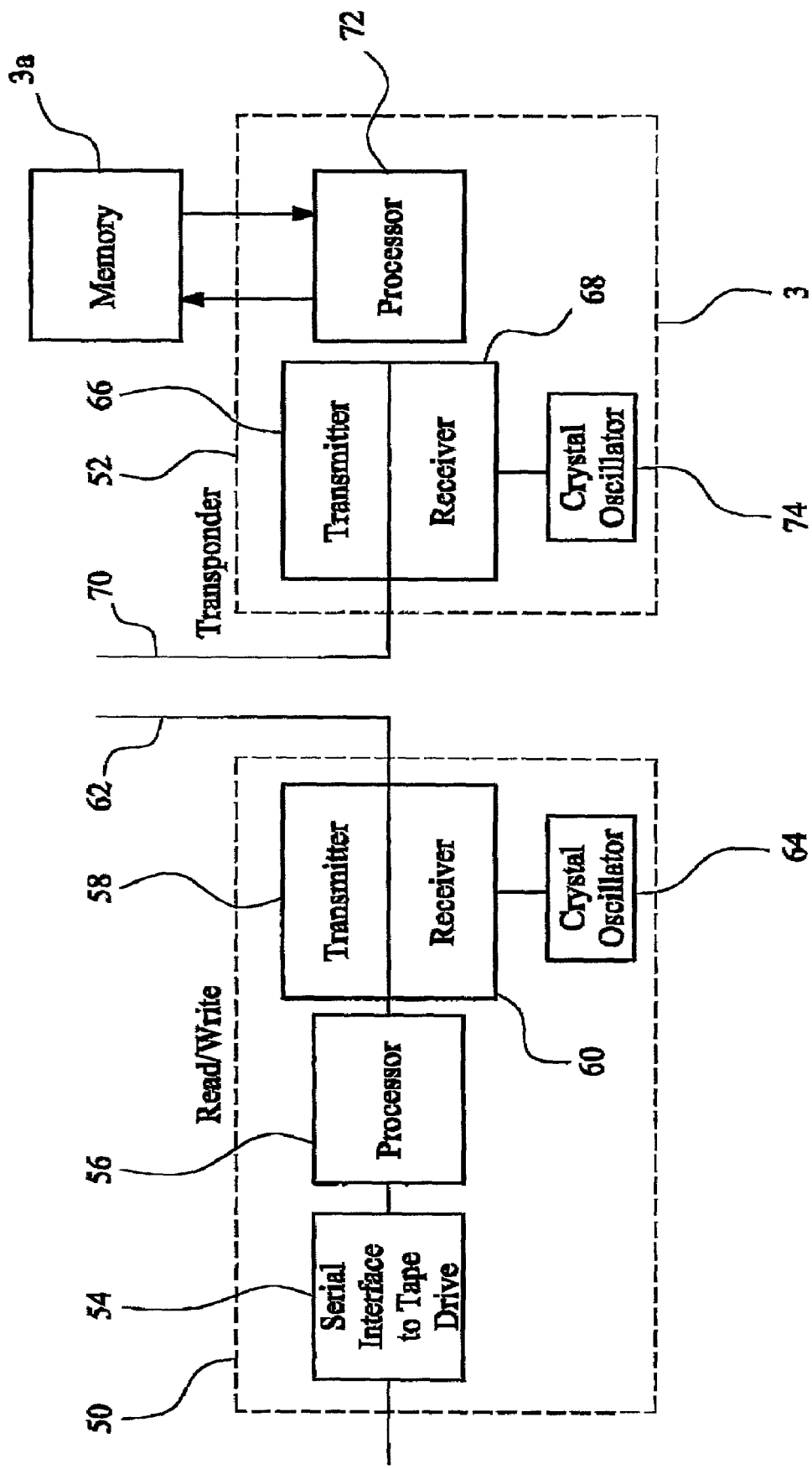
FIG. 9 illustrates schematically a device for writing data to the memory device.

In FIG. 6, the procedural steps involved in carrying out a restore/validation operation are illustrated.

Following loading of the tape 4 to be validated/restored from into the drive 2, the drive reads the signature flag, the number of entries in the signature table 11, and the position of the last signature entry (step 28).

The tape drive uses this information to recognise the type of media installed and the number of entries available and reports this information back to the controlling software application on the host system via a mode page with the drive (step 30).

If the number of entries is 16, (step 32), the tape is reported as read only to prevent further entries being made to the tape (step 34). The tape drive reports, through being interrogated by the controlling back up application, if it is capable of signature creation via another flag on the same mode page as the information for the data cartridge. The back up application then decides how the CRC is generated, i.e. by the tape driver or back up application.

If capable of displaying messages, the drive will report that this is a cartridge with signature capability and will also report the number of entries in the signature table 11.

If the number of entries is less than 16 (step 32), the controlling application requests the drive to report the signature of the required data set to be restored or validated (step 36) and the tape drive complies with this request by reporting the requested signature and the appropriate signature counter value from the cartridge memory (step 38).

The controlling software application then issues a reposition command to the drive causing it to reposition to the start of the required data set. If the tape drive is itself capable of signature generation it will generate a signature for this data set as it is read back from the tape, this new signature being reported back on the signature mode page as another flag value for data read from tape. (Steps 40 and 42). If the tape drive is not itself capable of signature generation (it is preferred that it is), the controlling software application generates the signature for the data set being read from tape. One advantage of the tape drive generating the signatures is that the system would then be less prone to software modifications. However, this does not preclude the software generating the signatures for tape drives that do not support the CRC generation capability.

At the end of reading back of the data set, the signature generated by either the tape drive or the controlling software application is compared with the original signature stored during writing of that data set (step 44). If they agree then the data is unaltered and hence valid (step 48), but if they do not agree then the data is considered to have been altered or tampered with and therefore not valid (step 46).

Thus, with an external cartridge memory reader device which has a connection (physical or virtual) with the computer system and the controlling back up application, the signatures and number of entries on tapes can be examined and compared against information on a secure database (if they do not agree then the tape is assumed to have been tampered with or altered), thereby avoiding the need for the tape to be loaded and restored or read in order to determine if new data has been written to the tape.

Such a device 6 is shown in FIG. 10, and comprises a casing 76 having means 78 for receiving a tape data storage cartridge in the form of a port arranged to locate a cartridge; a display device, preferably a liquid crystal display 80; a user input interface 82 having a finger operable keypad; a battery power supply; a receiver device for communicating with a memory storage device on a tape data storage cartridge, the receiver device being located in or near the cartridge port; and an external port 84 for connecting to an external computer device or processor.

Referring to FIG. 11 herein, there is further illustrated schematically components of the reader device 6, configured for reading, and displaying data from a transponder 52 having a read/write memory 3a and an aerial 70 in a tape data storage cartridge 4.

The reader device comprises an aerial 86, a receiver 88, a processor 90, a programmable memory area 92, a control interface 94, a display 80, a Read Only Memory (ROM) 96 containing an operating system, and a keypad 82 for entering instructions from a user. Interface 94 is capable of unloading to or down from an external device 98 having a processor.

The processor 90 has a relatively small amount of separate memory 92 of the order of 1 MByte or less, and is limited practically by the smallest size of memory chip commercially available. Alternatively, the processor 90 may be constructed integrally with memory area 92 on a same chip, for example a known Power PC® chip.

The aerial 86 and receiver 88 are used to receive data from the memory device 3 of the cartridge, which uses an electrically erasable programmable read only memory (EEPROM) as read/write memory area 3a. With the data storage cartridge inserted in the reader device, the aerial 70, of the memory device, forms a contactless interface with the aerial 86 of the reader device using an inductive coupling scheme using a magnetic field to transmit data to the receiver 88. Such a scheme may be the protocol used to transmit information by the inductive coupling scheme is known as the MIFARE® system developed by Phillips/Mikron of the type presently employed in "Smart" credit card technology for use in personal banking applications and which is known in the art. Advantages and features of this system as used by the first embodiment include a high reliability; operating frequency 13.56 MHz; and an anti-collision protocol, which provides an ability to handle several transponders in close proximity without interference.

Aerial 86 of the reader device is positioned such that when a tape cartridge having a cartridge aerial 70 is positioned in the cartridge receiving means 78 of the reader device 6, the two aerials are positioned a distance less than or equal to 20 mm from each other, so that inductive coupling can occur between the two aerials. Over such a range this yields coupling factors between aerials of the order 1 to 10% and transmission speeds of the order 100 Kbps between the aerials. Receiver 88 of the reader device transmits an inductive signal which is received by the transponder 52 of the tape cartridge, and which powers the transponder memory storage device 3 in the tape cartridge, such that the transponder is able to emit signals describing the content of the memory storage area 3a across an air gap between the two aerials, which is received by receiver 88. Alternatively, transmission of data signals between the memory device 3 and the reader device 6 may be within the infrared range of frequencies.

Data read from the memory device 3 in this manner is written via the processor 90 to programmable random access memory, RAM 92, where a copy of all read data is maintained. Data stored in the RAM 92 is displayed on the display screen 80 or is accessed via external processor 98 using the control interface 94.

The invention is not restricted to the details of the foregoing embodiments.

The invention claimed is:

1. A method of recording data during successive data recording sessions on a data storage tape of a tape cartridge loaded in a tape drive, the sessions occurring at different times, the method comprising recording data in each recording session by:

positioning the tape prior to the start of the data recording session so the tape is positioned to a start point at the start of a data set to be recorded during the session;

after the session has started and during the data recording session, writing the data set to the tape;

after the data set has been written to the tape, issuing a reposition command to the tape drive so the tape is repositioned;

creating a code representative of the data in the data set that has been written during the recording session between the position command and the reposition command;

after the tape drive receives the reposition command, writing the code into a memory incorporated within the tape cartridge;

in response to the code being written into the memory, incrementing a code counter indicating a count of the number of codes written into the memory; and writing the count into a count field of the memory.

2. A method according to claim 1, wherein the code includes a signature.

3. A method according to claim 2 wherein the signature is coded to include a checksum or a cyclic redundancy check (CRC).

4. The method of claim 2 wherein one of the recording sessions is for backing up data, and performing the following steps during the session:

preventing rewriting of a signature by limiting access to the memory to allow only (a) retrieval of signatures, and (b) creating of a new signature at a previously unused counter location.

5. The method of claim 4, wherein the signature is written to the next free slot of the memory at the same time that the signature count is incremented in the code counter.

6. A method according to claim 1, wherein the memory includes a cartridge memory that differs from the tape.

7. A method according to claim 1, wherein the memory includes a dedicated area of the tape.

8. A method as claimed in claim 1, further including the steps of:

reading back a data set from the tape;

creating a further code representative of the data in the data set read back from the tape;

comparing the two codes; and confirming the data set as valid only if the two codes agree.

9. A method according to claim 8, wherein the comparing and confirming steps are carried out by a controlling software application.

10. A method according to claim 8, wherein at least one of the comparing and confirming steps is carried out by an external reader which accesses and displays information recorded in the memory.

11. The method of claim 8, wherein the steps recited in claim 8 are performed in connection with a recording session during which data are restored.

12. A method according to claim 1, further including the steps of checking whether the number of codes written into the memory has reached a predetermined number and, if so, reporting the tape as read only.

13. A method according to claim 1, further including the step of comparing the codes and number of entries against information held on a secure database.

14. Apparatus for recording data during successive data recording sessions occurring at different times, on a data storage tape of a tape cartridge, the apparatus comprising:

a tape drive to receive the tape cartridge, and a processor having software to control the tape drive to record data in each recording session by performing the steps of claim 1.

15. Apparatus according to claim 14, wherein the code includes a signature.

16. Apparatus according to claim 14 wherein the signature is coded to a checksum or a cyclic redundancy check (CRC).

17. Apparatus according to claim 14, wherein the memory includes a cartridge memory.

18. Apparatus according to claim 14, wherein the memory includes a dedicated area of the tape.

19. Apparatus as claimed in claim 14, wherein the processor is arranged to read back a data set from the tape, create a further code representative of the data in the data set read back from the tape, compare the two codes, and confirm the data set as valid only if the two codes agree.

20. Apparatus according to claim 19, comprising an external reader for accessing and displaying information recorded in the memory.

21. The apparatus of claim 19, wherein the processor is arranged to perform the steps of claim 19 in connection with a recording session during which data are restored.

22. Apparatus according to claim 14, wherein the processor software includes an erase command for erasing both the data on the tape and the contents of the memory.

23. Apparatus according to claim 14, wherein the processor is arranged to check whether the number of codes written into the memory has reached a predetermined number and, if so, to report the tape as read only.

24. The method of claim 1, wherein the method is performed to backup data of a computer to the data storage tape so that the data set written to the tape is the set of data of the computer being backed up and the created code is indicative of the backed up data.

25. The method of claim 1, wherein the memory includes an area for storing several codes corresponding with data sets written to the tape, the method further comprising: writing, into different portions of the area, different codes corresponding with each different data set written into the tape as a result of writing the different data sets into the tape; performing a restoration or validation operation of a data set on a tape of a tape cartridge loaded in the drive; the restoration or validation operation including: (a) causing the tape drive to comply with a request to report the code of a data set required to be restored or validated by reading the requested code from the portion of the memory area where the code for the data set required to be restored or validated is located; (b) positioning the tape to the start of the data set to be restored or validated; (c) then reading the data set to be restored or validated back from the tape; (d) generating a new code corresponding with the data set read during (c), the new code being generated externally of the memory; and (e) after completion of step (e), comparing the new code generated during (d) with the code read during (a) to determine if the data set read during (c) is valid or invalid.

26. The method of claim 1, wherein writing the code comprises repositioning the tape prior to writing the code into the memory.

27. Apparatus for recording data during successive data recording sessions occurring at different times, on a data storage tape of a tape cartridge, the apparatus comprising:
- a tape drive arranged to receive the tape cartridge;
- means for issuing a position command to the tape drive;
- means for causing-the data recording session to start after the tape drive has been positioned to a start of a data set to be recorded during the session in response to the issued command;
- means for writing the data set to the tape after the data recording session has started and during the data recording session;
- means for issuing a reposition command to the tape drive for causing the tape to be repositioned after the data set has been written to the tape;
- means for creating a code representative of the data in the data set that has been written during the recording session between the position command and the reposition command;
- means for writing the code into a memory incorporated within the tape cartridge after the tape is repositioned;
- means connected to be responsive to the code being written into the memory for incrementing a code counter for indicating a count of the number of codes written into the memory; and
- means for writing the count into a count field of the memory.

28. Apparatus according to claim 27, wherein the code includes a signature.

29. Apparatus according to claim 27, wherein the signature is coded to include a checksum or a cyclic redundancy check (CRC).

30. Apparatus according to claim 27, wherein the memory includes a cartridge memory that differs from the tape.

31. Apparatus according to claim 27, wherein the memory includes a dedicated area of the tape.

32. Apparatus according to claim 27, further comprising means to read back a data set from the tape, means to create a further code representative of the data in the data set read back from the tape, means to compare the two codes, and means to confirm the data set as valid only if the two codes agree.

33. The apparatus of claim 32, wherein the means recited in claim 32 are arranged to be activated in connection with a recording session during which data are restored.

34. Apparatus according to claim 27, further comprising means to access and display information recorded in the memory.

35. Apparatus according to claim 27, further comprising means to check whether the number of codes written into the memory has reached a predetermined number and, if so, to report the tape as read only.

36. The apparatus of claim 27, wherein the memory includes an area for storing several codes corresponding with data sets written to the tape, the drive being arranged for: (A) writing, into different portions of the area, different codes corresponding with each different data set written into the tape as a result of writing the different data sets into the tape; (B) performing a restoration or validation operation of a data set on a tape of a tape cartridge loaded in the drive; the restoration or validation operation including: (a) causing the tape drive to comply with a request to report the code of a data set required to be restored or validated by reading the requested code from the portion of the memory area where the code for the data set required to be restored or validated is located; (b) positioning the tape to the start of the data set to be restored or validated; (c) then reading the data set to be restored or validated back from the tape; a processor arrangement for (i) generating a new code corresponding with the data set read during (c), the new code being generated externally of the memory; and (ii) after completion of step (c), comparing the new code generated during (i) with the code read during (a) to determine if the data set read during (c) is valid or invalid.

37. The apparatus of claim 36, wherein the tape drive includes the processor arrangement for (i) generating the new code.

38. A method of recording data during successive data recording sessions on a data storage tape of a tape cartridge loaded in a tape drive, the sessions occurring at different times, the method comprising recording data in each recording session by:
- positioning the tape prior to the start of the data recording session so the tape is positioned to a start point at the start of a data set to be recorded during the session;
- after the session has started and during the data recording session, writing the data set to the tape;
- after the data set has been written to the tape, issuing a reposition command to the tape drive so the tape is repositioned;
- creating a code representative of the data in the data set that has been written during the recording session between the position command and the reposition command;
- writing the code into a memory incorporated within the tape cartridge after the tape is repositioned, wherein the memory comprises a cartridge memory that differs from the tape;
- in response to the code being written into the memory, incrementing a code counter indicating a count of the number of codes written into the memory; and
- writing the count into a count field of the memory.

* * * * *